US012664472B2

(12) United States Patent (10) Patent No.: US 12,664,472 B2
Zhang et al. (45) Date of Patent: Jun. 23, 2026

(54) SENSITIVE DATA DETECTION USING DOMAIN-ENHANCED ATTENTION NEURAL NETWORKS

(71) Applicant: Capital One Services, LLC, McLean, VA (US)

(72) Inventors: Rui Zhang, New York, NY (US); Sudheendra Kumar Kaanugovi, Aldie, VA (US); Sandeep K. Gadde, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 596 days.

(21) Appl. No.: 18/094,644

(22) Filed: Jan. 9, 2023

(65) Prior Publication Data

US 2024/0232695 A1 Jul. 11, 2024

(51) Int. Cl.
*G06N 20/00* (2019.01)
(52) U.S. Cl.
CPC ................................... *G06N 20/00* (2019.01)
(58) Field of Classification Search
CPC ............................... G06N 20/00; G06N 3/08
See application file for complete search history.

(56) References Cited

U.S. PATENT DOCUMENTS

| 10,079,835 B1 * | 9/2018 | Dodke | ................. H04L 63/0245 |
| 10,333,902 B1 * | 6/2019 | Druker | .................... G06F 21/60 |

| 2018/0232528 A1 * | 8/2018 | Williamson | ........ G06F 21/6245 |
| 2020/0410116 A1 * | 12/2020 | Williamson | ........... G06N 20/00 |
| 2021/0027023 A1 | 1/2021 | Olabiyi et al. | |
| 2021/0073677 A1 | 3/2021 | Peterson et al. | |
| 2021/0248268 A1 | 8/2021 | Ardhanari et al. | |
| 2021/0303783 A1 | 9/2021 | Misra et al. | |

(Continued)

FOREIGN PATENT DOCUMENTS

| CN | 111709052 B | 5/2021 |
| CN | 113065330 A | 7/2021 |

OTHER PUBLICATIONS

Ahmed, Usman, A Machine Learning Model for Data Sanitization, Computer Networks, vol. 189, 2021, 6 pages, 107914, ISSN 1389-1286, https://doi.org/10.1016/j.comnet.2021.107914. (https://www.sciencedirect.com/science/article/pii/S1389128621000700) (Year: 2021).*

*Primary Examiner* — Barbara M Level
(74) *Attorney, Agent, or Firm* — Sterne, Kessler, Goldstein & Fox P.L.L.C.

(57) ABSTRACT

Provided herein are systems and methods for detecting and sanitizing sensitive data using domain-enhanced attention neural networks. In some embodiments, a processor of a client retrieves training data comprising tuples. Each tuple comprises a first parameter and a second parameter. For each tuple the processor matches a substring in a first parameter of the respective tuple to a keyword of a plurality of keywords, identifies a security category corresponding to the at least one keyword, and expands the first parameter of the respective tuple to comprise a respective string associated with the application event and the security category. The processor trains a model to detect and sanitize the sensitive data from the application events using the tuples, including an expanded first parameter for each tuple. The processor sanitizes the sensitive data using the trained model.

20 Claims, 6 Drawing Sheets

300

(56)             References Cited

U.S. PATENT DOCUMENTS

| | | | |
|---|---|---|---|
| 2021/0319054 | A1 | 10/2021 | Glass et al. |
| 2022/0230078 | A1* | 7/2022 | Matlick .................... G06N 5/04 |
| 2022/0382891 | A1* | 12/2022 | Shmidov ................. G06N 5/04 |
| 2022/0417289 | A1* | 12/2022 | Azulay .............. H04L 63/1425 |
| 2023/0096474 | A1* | 3/2023 | Krishnan ............ G06N 3/0464 |
| | | | 726/26 |
| 2025/0036809 | A1* | 1/2025 | Nadav ................ G06F 21/6254 |
| 2025/0094611 | A1* | 3/2025 | Bell .................... G06F 21/6245 |
| 2025/0225260 | A1* | 7/2025 | Hu ......................... G06N 20/00 |

* cited by examiner

300

Retrieve training data
302

Search for a substring
304

Identify a security category
306

Expand the first parameter
308

Train model
310

400

Receive an application event string
402

Identify a security category
404 identify sensitive data
406

Determine the sanitization type
408

Sanitize the sensitive data
410

Store the sanitized application event string
412

SENSITIVE DATA DETECTION USING DOMAIN-ENHANCED ATTENTION NEURAL NETWORKS

BACKGROUND

Applications often emit events based on a user's interaction with the event. For example, the events may be generated based on a user logging into an application, submitting a request, retrieving information, etc. The application events may be logged in a data storage device for troubleshooting, analytics, archiving, research, etc. The data storage devices may be associated with the application provider or outside third-parties. Moreover, the application events may include information about a user using the application. When application events are transmitted to the data storage device, sensitive data is exposed both by the transmission of the application events and storage in the data storage device. The exposure can represent unacceptable security and privacy risks to users. However, identifying the sensitive data in the application events may be an error-prone and time-consuming task.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
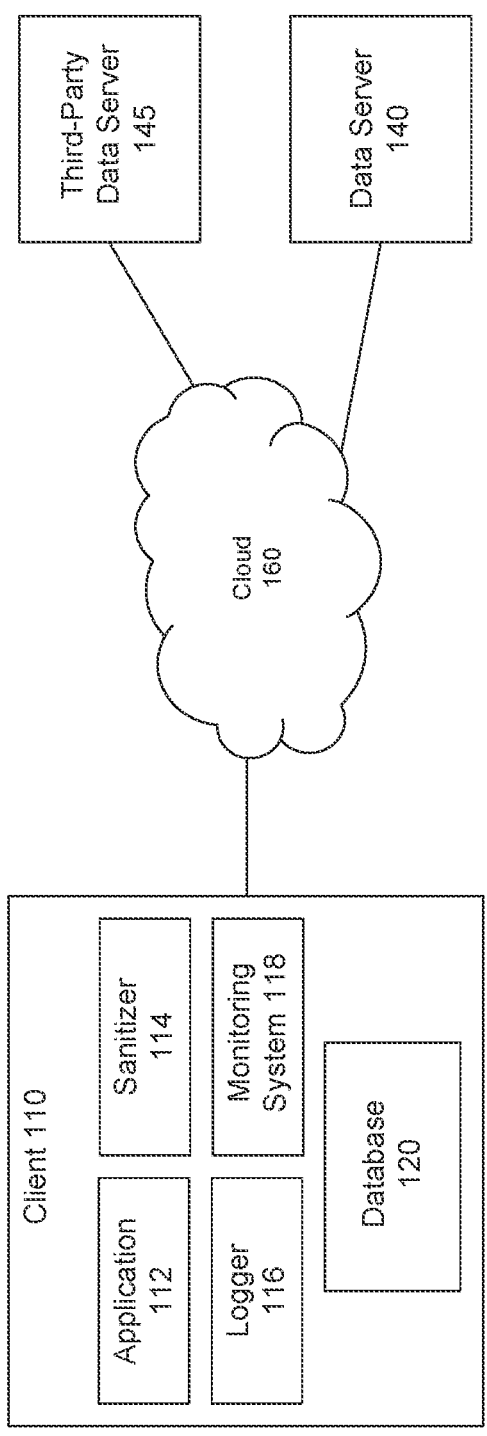
FIG. 1 illustrates a block diagram of a sanitization system, according to some embodiments.

Provided herein are system, method, and/or computer program product embodiments, and/or combinations and sub-combinations thereof, for detecting and sanitizing sensitive data using domain-enhanced attention neural networks.

As described above, applications running on distributed systems generate information based on user interactions or events occurring within the application. User interactions include users logging in to the application, inputting or accessing information, and making use of tools or utilities provided by the application, etc. Events occurring in the application include displaying features or running other application programming interfaces (APIs) in the application. Logging systems log data from the user interactions and events for various uses, such as troubleshooting, research, or analysis of application performance.

As part of running an application on a distributed system, the data from the user interactions and events are often logged or stored in a data server or data storage that are remote to the device running the application. Furthermore, the proliferation of cloud networking and storage solutions sometimes means that the data is stored on a third-party server. Both the transmission of the data through the distributed system and the storage of the data on the third-party server can expose sensitive data in the logged data, such as social security numbers, credit card numbers, or device identifiers.

In order to protect the sensitive data included in the data, the sensitive data may need to be sanitized to remove, obfuscate, or encrypt the sensitive data in the data. However, it may be difficult to identify the sensitive data in the data. Attempting to identify the sensitive data may generate false positives and false negatives when attempting to log the data. To this end, false positives may prevent the accurate logging of the data, and false negatives may inadvertently expose sensitive data in the logged data.

Embodiments described herein resolve these issues by detecting and sanitizing sensitive data using domain-enhanced attention neural networks. In some embodiments, a processor of a client retrieves training data comprising tuples. Each tuple comprises a first parameter and a second parameter. The first parameter comprises a string associated with an application event, and the second parameter comprises a sanitization label. For each tuple, the processor matches a substring in a first parameter of the respective tuple to a keyword of a plurality of keywords, identifies a security category corresponding to at least one keyword, and expands the first parameter of the respective tuple to comprise a respective string associated with the application event and the security category. The processor trains a model to detect the sensitive data from the application events using the tuples, including an expanded first parameter for each tuple. The model is configured to implement a deep neural network, including a special attention mechanism. The processor sanitizes the sensitive data using the trained model.

The embodiments described herein provide for leveraging strong domain-specific security signals to enable accurate, sensitive data classification. Furthermore, the embodiments described herein use fixed attention weights to train a model to detect and sanitize sensitive data from application events. This reduces the number of false negatives and false positives when attempting to detect sensitive data in application events before the application events are logged. To this end, the embodiments described herein accurately store or log application events and prevent inadvertent exposure of sensitive data.

FIG. 1 illustrates a block diagram of a sanitization system, according to some embodiments. A client 110 includes a monitoring system 118 for monitoring interactions between a user and application 112 and events occurring in application 112. Logger 116 logs application events. The application events may include information from the user interactions and events with application 112. The application events may be API requests, form submissions, HTML requests, etc. The application events are transmitted via cloud 160 to data storage devices such as a data server 140 or third-party data server 145 for storage.

Client 110 includes a sanitizer 114 for sanitizing the application events prior to transmission to a data server 140 or third-part data server 145. Sanitizer 114 uses a deep neural network to detect and sanitize sensitive data from application events that are domain-specific. To this end, the deep neural network may be trained using domain-specific training data and a domain-specific lookup table. The training data and lookup table may be stored in database 120. Database 120 may reside within or outside client 110. Sanitizer 114 will be described in further detail with respect to FIG. 2.

Client 110 is a device or system configured to run application 112. As non-limiting examples, client 110 is a laptop, a smartphone, a tablet, a thin client, or a distributed computer interface system. In some embodiments, client 110 is a computer system, such as computer system 500 described below in FIG. 5. A user accesses application 112 via client 110. Application 112 allows a user to access information or services through the internet. As a non-limiting example, application 112 is an online shopping application, a mobile banking application, or other applications that handle sensitive user or client 110 information.

Client 110 is configured to run monitoring system 118, which monitors interactions between the user and application 112 and events occurring in application 112. In some embodiments, monitoring system 118 monitors more than one application 112 on client 110. Monitoring system 118 receives application events. The application events may include information about the interaction(s) and event(s).

Cloud 160 is a network, a cloud system, or other distributed computing system that allows devices and systems to communicate, such as via a wireless network or the internet. Cloud 160 may host third-party data server 145 or data server 140.

Figure 2A:
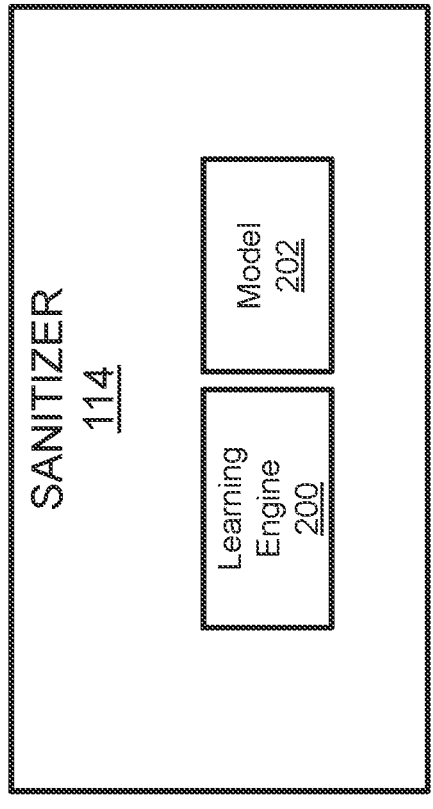
FIG. 2A illustrates a block diagram of sanitizer comprising a model trained to detect and sanitize sensitive data, according to some embodiments.

FIG. 2A illustrates a block diagram of sanitizer 114 comprising a model trained to detect and sanitize sensitive data, according to some embodiments. FIG. 2A will be described with reference to FIG. 1.

In some embodiments, sanitizer 114 may include learning engine 200 and model 202. In some embodiments learning engine 200 may reside outside sanitizer 114 and/or client device 110. For example, learning engine 200 may reside on a server. Other devices may communicate with learning engine 200 to train model 202. Furthermore, the server may receive requests from client device 110 or other devices to sanitize data from an application event. Model 202 may be trained to sanitize sensitive data from application events received from any device.

Learning engine 200 may retrieve training data to generate or train one or more of models 202 from database 120. The training data may include tuples (e.g., $D_i = <X_i, Y_i>$). Each tuple may comprise two parameters, $X_i$ and $Y_i$. $X_i$ may be an input text or string vector, and $Y_i$ may be a vector comprising a sanitization label for each token (e.g., a word in the input text). For example, $X_i$ may be an input text or string corresponding to a pseudo application event. To this end, $X_i$ may include an API name or identifier. As a non-limiting example, $X_i$ may be "function ../tiger/user_login: User with SSN 555-55-5555 logged in." In this scenario, $X_i$ may be a login event and $Y_i$ may be sensitive data Learning engine 200 may also retrieve a lookup table from database 120. The lookup table may comprise keywords that are commonly included in application events mapped to security categories. As a non-limiting example, the security categories may be Application Program Interface (API) categories (e.g., cat0, cat1, cat2, cat3, etc.). Cat1 may indicate that the application event comprises highly sensitive data. Conversely, cat3 may indicate that the application event comprises less sensitive data. As a non-limiting example, the keywords may include the word "tiger". To this end, the lookup table may indicate that application events, including the word "tiger," may correspond with cat1 and, therefore, include highly sensitive data.

Learning engine 200 may expand the training data with security categories. In particular, for each training data point (e.g., $D_i = <X_i, Y_i>$) and for each keyword, learning engine 200 attempts to identify a respective keyword in the input text or string $X_i$. If the keyword is found in the input text or string of $X_i$, learning engine 200 identifies the category that corresponds to the keyword. Learning engine 200 expands $X_i$ to include the category with the input text or string.

As a non-limiting example and as indicated above, $X_i$ may be "function ../tiger/user_login: User with SSN 555-55-5555 logged in." and "tiger" may be a keyword. Tiger may correspond with a particular API configured to transmit requests, including sensitive data. As such, learning engine 200 may match "tiger" in $X_i$ with the keyword "tiger" in the lookup table. Learning engine 200 may determine that the keyword "tiger" corresponds with category 1 or cat1 based on the lookup table. Learning engine 200 may expand $X_i$ to "function ../tiger/user_login: User with SSN 555-55-5555 logged in. category 1".

In some embodiments, if a keyword cannot be found in $X_i$, learning engine 200 may add a default category to $X_i$. As a non-limiting example, the default category may be cat0.

The expanded training data set may be used to train model 202. Model 202 may be configured to implement a deep neural network such as transformer-based named entity recognition (T-NER). As a non-limiting example, T-NER is a python library that may be used to train a T-NER models. The T-NER model is an architecture that can handle sequence to sequence modeling and long-range dependencies. The T-NER model involves encoding-decoding and an attention mechanism.

The T-NER model may encode the characters or words in a string into an encoded vector representation. In some embodiments, model 202 may use Bidirectional Encoder Representations from Transformers (BERT) for encoding. The encoded vector representation may include words of the string and a hidden state of each word.

The encoded vector representation may be decoded to predict the output with a classification or label for some or each of the words in the string. The T-NER model may use a softmax function to predict the output with the classification or labels. A softmax function is a mathematical function that converts a vector of numbers into a vector of probabilities. The vector of probabilities may be used to predict the output with classification or labels.

The T-NER model may also use an attention mechanism in the encoding and decoding process. In some embodiments, the attention mechanism uses alignment scores, weights, and context vectors to score and determine how a word relates to other words in a sequence (e.g., a string), and may include character-level representations. The attention mechanism scales the scores according to the weights to focus on the relevant character or word in the string. The attention mechanism produces an attention output for each character or word. The attention output may indicate the relevance of the character or word in the string. In other words, the attention mechanism allows the T-NER model to identify relevant characters or words in the string.

The attention mechanism may be a self-attention mechanism. The self-attention mechanism allows the T-NER model to create connections or relationships between words in a string.

For example, input text may be "The goat climbed a hill". The T-NER model may use the self-attention mechanism to identify the relationship between each word in the input text. Specifically, the T-NER model may use the special attention mechanism to identify a relationship between "The" and "goat", "climbed" and "goat", "climbed" and "the", "a" and "climbed", "a" and "goat", "a" and "the", "hill" and "a", "hill" and climbed", "hill" and "goat", and "hill" and "the". The T-NER model may score the relationships between the words in the input text based on the weights assigned to the words. A new representation of a word in the input text (e.g., "hill") is determined using similarity scores between the word (e.g., hill) and the remaining words in the input text and the original embeddings of the remaining words. For example, the words "goat", "climbed", and "hill" may be assigned higher weights, as these words are the most relevant words in the input text.

In this regard, as described above, learning engine 200 the expanded training data set to train model 202. For example, the expanded training data set may include tuples, $X_i$. and $Y_i$. $X_i$ may be the input text (e.g., application event), and $Y_i$ may be a sanitization label. In the training process, model 202 may encode and decode $X_i$ for each tuple in the respective expanded training data set using the attention mechanism. This way, model 202 may understand the relationship between the keyword, sensitive data, and category in $X_i$.

Model 202 may classify $X_i$. The classification of $X_i$ may include determining whether $X_i$ includes sensitive data, the position of the sensitive data in $X_i$, and whether the sensitive data is to be sanitized. Model 202 can verify the classification of $X_i$ using $Y_i$. That is, model 202 can verify the classification of $X_i$ using the sanitization label. Model 202 may tune the parameters (e.g., attention weights) and recursively attempt to classify $X_i$ for each tuple until it reaches a predetermined accuracy level. Once trained, model 202 may be configured to detect and sanitize sensitive data from application events before the application events are stored in third-party data server 145 or data server 140.

As a non-limiting example, an application event may be a user logging into application 112. The application event may include the user's social security number, keywords corresponding to an API being used by application 112 to authenticate the user, a timestamp, and other information about the login event. The application event may be a string.

Application 112 may transmit the application event to third-party data server 145 or data server 140 for storage. Monitoring system 118 may receive the application event. Monitoring system 118 may determine that since the application event was a login event, it may include sensitive data. Monitoring system 118 may transmit the application event to sanitizer 114.

Sanitizer 114 may receive the application event. Learning engine 200 may match a keyword from the application event to a security category. Learning engine 200 may expand the application event to include the identified category. Sanitizer 114 may instruct model 202 to detect and sanitize sensitive data from the expanded application event. Model 202 use the deep neural network (e.g., T-NER) to detect and sanitize the sensitive data from the application event.

Furthermore, sanitizer 114 determines the sanitization type based on the sensitive levels. The sanitization type may be pruning values, redacting values, or encrypting values. In some embodiments, pruning involves removing or deleting a value from the extracted information. In some embodiments, redacting values involves replacing the value with different information that is not based on the original value. In some embodiments, redacting a value replaces the value with a coded number that is based on the label for the value but not on the value itself. In some embodiments, encrypting values involves encoding the values based on an encryption scheme. For example, public/private key encryption or other asymmetric encryption approaches are used to encode values. In some embodiments, the label for a value is not sanitized and left in the extracted information to identify that such a value was present. In some embodiments, the label for a value is sanitized in addition to the value.

In some embodiments, different types of sanitization are assigned to different sensitivity levels. Model 202 may be trained to identify the sensitivity level of the sensitive data in the application events. For example, high sensitivity is assigned to pruning, medium sensitivity is assigned to redacting, and low sensitivity is assigned to encrypting. In some embodiments, sanitizer 114 is configured to first prune the extracted information, then redact the extracted information, then encrypt the extracted information.

In some embodiments, different encryption techniques are applied to sanitize logged data at the same sensitivity level. The different encryption techniques can vary to provide different levels of security and encryption processing time. For example, the encryption techniques can vary by encryption key length, algorithm, or use of symmetric or asymmetric keys. In some embodiments, where there is more low sensitivity logged data than medium or high sensitivity logged data, the low sensitivity logged data can be sanitized to balance time taken for encryption with a degree of security.

In some embodiments, the low sensitivity data can be assigned an encryption technique based on the size or length of the value. In some embodiments, a specific encryption technique may be assigned based on the amount of low-sensitivity data that is to be encrypted. For example, the specific encryption technique is selected to ensure that the low-sensitivity data can be sanitized within a certain time period. As another example, the specific encryption technique is selected based on a combination of time to sanitize the logged data and a minimum level of security. When there is less data to sanitize, an encryption technique with a higher level of security is used to better protect the data. When there is more data to sanitize, an encryption technique with a lower level of security, but not less than a minimum level, is selected to safely encrypt the data without slowing down processing or performance of application 112 and client 110.

Client 110 runs logger 116, which logs the application event, including the sanitized data, to remote data storage, such as data server 140 or third-party data server 145. Data server 140 is a server or data storage, such as cloud-based storage, that is maintained by a business or entity that controls or owns monitoring system 118. Third-party data server 145 is a server or data storage, such as cloud-based storage, that is maintained or controlled by a third party. In some embodiments, sanitizing the extracted information prior to logging it increases security and privacy for transmission of the extracted information to the remote data storage. In some embodiments, sanitizing the extracted information prior to logging it increases security and privacy for the storage of the extracted information.

In some embodiments, the lookup table, including the keywords and the categories, may be updated. As such, model 202 is continuously trained and refined to detect and sanitize sensitive data from application events based on the current keywords and categories.

In some embodiments, the logged data is accessed for research or analysis purposes. For example, the logged data can indicate trends for the use of application 112 or common events. As another example, the logged data can be used to identify improvements to make to application 112.

Figure 2B:
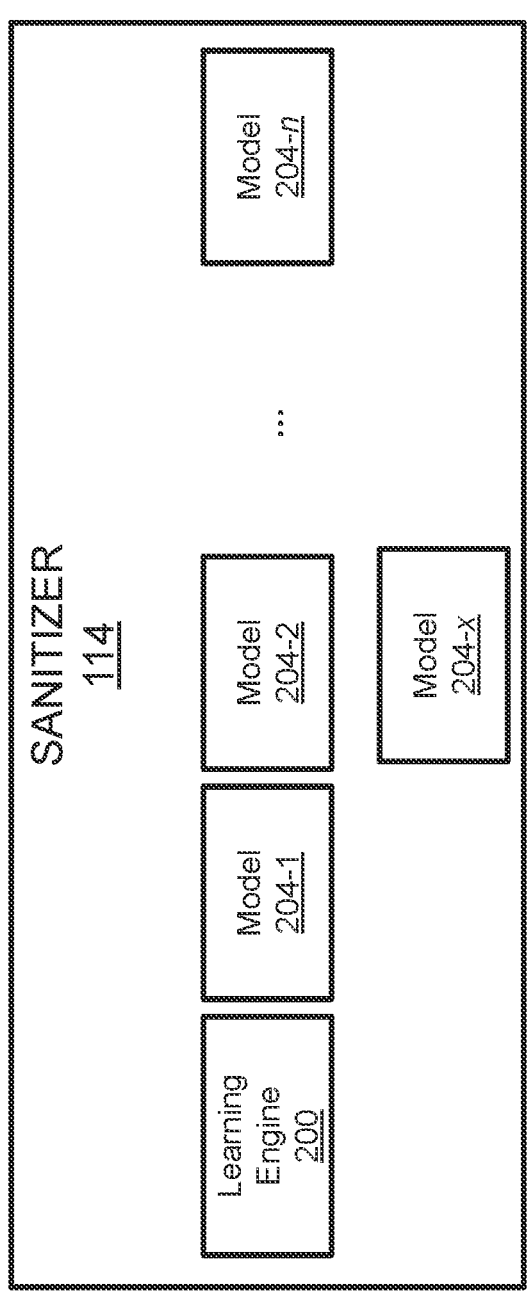
FIG. 2B illustrates a block diagram of sanitizer comprising multiple model trained to detect and sanitize sensitive data, according to some embodiments.

FIG. 2B illustrates a block diagram of sanitizer 114 comprising multiple models trained to detect and sanitize data, according to some embodiments. FIG. 2B will be described with reference to FIGS. 1 and 2A.

In some embodiments, sanitizer 114 may comprise models 204-1-204-n and 204-x. Learning engine 200 may generate an expanded training data set for each security category or category group. For example, each expanded training data set may be D[k], and each category may be C[k], where k=1, 2, 3, . . . . n. Learning engine 200 may determine whether the expanded training data sets include enough training data that learning engine 200 may train a different model for each category. In some embodiments, learning engine 200 may use groupings for categories which may be specified by an expert or learned from data using methods (e.g., such as a model tree) that are customized to partition the input space using the security category as a variable.

If so, learning engine 200 may use the expanded training data sets D[k] to train model 204-1-204-n. That is, learning engine 200 may use D[k] to train model 204-1, D[k+1] to train model 204-2, D[k+2] to train model 204-3, etc. By doing so, model 204-1 may be configured to detect and sanitize sensitive data from application events associated with C[k] (i.e., category[k]), model 204-2 may be configured to detect and sanitize sensitive data from application events associated with C[k+1], model 204-3 may be configured to detect and sanitize sensitive data from application events associated with C[k+2], etc.

Models 204-1-204-n may be configured to implement a deep neural network such as transformer-based named entity recognition (T-NER) similar to model 202 in FIG. 2A.

In some embodiments, learning engine 200 may train a single model, model 204-x, to detect and sanitize sensitive data from the application events for all of the security categories. In some embodiments, learning engine 200 may use detection performance against a hold-out test data set to choose between 204-x and 204-1-204-n.

In this scenario, learning engine 200 may train model 204-x using the expanded training data. Model 204-x may be configured to implement the T-NER model (e.g., BERT Transformer Model), as described above.

In some embodiments, model 204-x may implement a T-NER model that uses a fixed special attention weight. Specifically, the T-NER model may use a fixed special attention weight for predefined patterns. As a non-limiting example, the fixed special attention weight may be a relatively high value in [0, 1] for domain knowledge that is indicated as high importance or that the model is configured to always pay attention to, such as security category.

As a non-limiting example, the fixed special attention weight may be w and w may be a hyper parameter for model 204-x. As such, in the training process, model 204-x may encode and decode $X_i$ for each tuple in the expanded training data using the special fixed attention weight. In this way, model 204-x may understand the relationship between the keyword, sensitive data, and category in $X_i$.

Model 204-x may classify $X_i$. The classification of $X_i$ may include determining whether $X_i$ includes sensitive data, the position of the sensitive data in $X_i$, and whether the sensitive data is to be sanitized. Model 204-x can verify the classification of $X_i$ using $Y_i$. Model 204-x may tune the parameters (e.g., w) and recursively attempt to classify $X_i$ for each tuple until it reaches a predetermined accuracy level.

In some embodiments, learning engine 200 may expand $X_i$ to include the category an m number of times in order for different w values (w1, . . . wm) to be leveraged by local attention mechanisms. As non-limiting example, learning engine 200 may expand $X_i$ of a given tuple to be "$X_i$ to "function ../tiger/user_login: category 1 User with SSN category 1 555-55-5555 logged in. category 1", where m=3. As illustrated, in some embodiments, the special security category token ("category 1") may be spread across the input to allow for multiple fixed attention weights w1, . . . , wm. To this end, m may also be a hyper parameter. Model-x may tune m and recursively attempt to classify $X_i$ for each tuple until it reaches a predetermined accuracy level.

Once models 204-1-204-n or model 204-x are trained, the models may be configured to detect and sanitize sensitive data from application events before the application events are stored in third-party data server 145 or data server 140, as described above with respect to model 202 in FIG. 2A.

For example, sanitizer 114 may receive an application event. Learning engine 200 may match a keyword from the application event to a security category. Learning engine 200 may expand the application event to include the identified category. In some embodiments, the category may be repeated m times in the expanded application event.

In some embodiments, sanitizer 114 may identify a respective model from models 204-1-204-n to detect and sanitize the sensitive data from the expanded application event based on the identified category. Alternatively, sanitizer 114 may instruct model 204-x to detect and sanitize sensitive data from the expanded application event. Models 204-1-204-n or model 204-x use the deep neural network (e.g., T-NER) to detect and sanitize the sensitive data from the application event.

Figure 3:
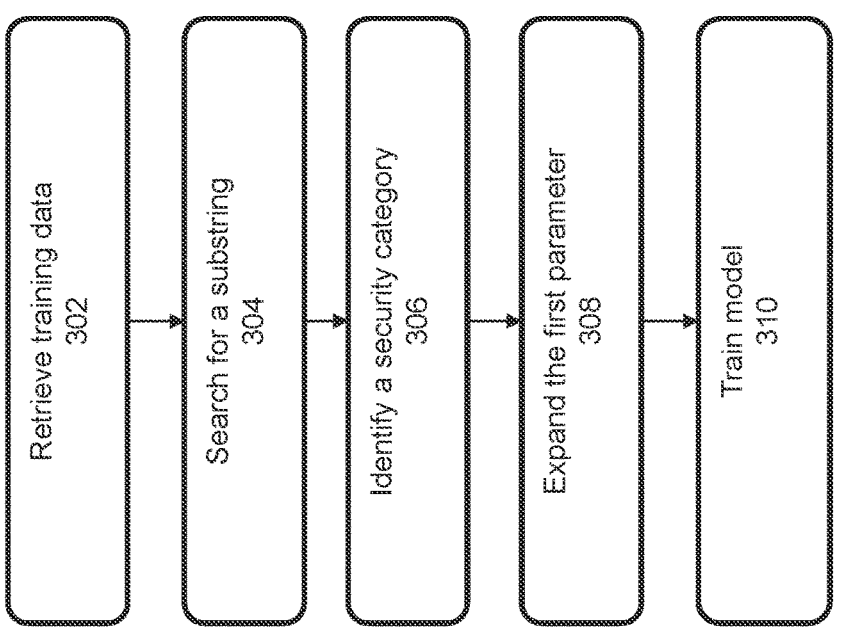
FIG. 3 is a flowchart illustrating a process for training a model to detect and sanitize sensitive data, according to some embodiments.

FIG. 3 is a flowchart illustrating a process for training a model to detect and sanitize sensitive data, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 3, as will be understood by a person of ordinary skill in the art.

Method 300 shall be described with reference to FIGS. 1-2. However, method 300 is not limited to that example embodiment.

In 302, learning engine 200 retrieves training data comprising tuples. Each of the tuples comprises a first parameter and a second parameter. The first parameter comprises a string associated with an application event and the second parameter comprises a sanitization label. Learning engine 200 may retrieve the training data from database 120. The first parameter may be a domain-specific signal.

In 304, learning engine 200 searches for a substring in a first parameter of the respective tuple to a keyword from a list of keywords. The list of keywords may be identified from a lookup table. Learning engine 200 may retrieve the lookup table from database 120.

In 306, learning engine 200 identifies a security category corresponding to at least one keyword in response to matching the substring of the first parameter of a respective tuple to the at least one keyword. Learning engine 200 may identify the security category from the lookup table. The security category may identify whether an application event comprises sensitive data and the level of sensitivity of the sensitive data. For example, the application event may include a name or identifier of an API transmitting a request. The name or identifier of the API may indicate whether the application event includes sensitive data.

In 308, learning engine 200 expands the first parameter of the respective tuple to include the string associated with the application event and the security category. In some embodiments, learning engine 200 may include the security category an m number of times in the first parameter.

Steps 304-308 may be repeated for each tuple and each keyword in the list of keywords.

In 310, learning engine 200 trains the model to detect and sanitize the sensitive data from the application events using the tuples, including the expanded first parameter for each tuple of the plurality of tuples. The model is configured to implement a deep neural network, including a special attention mechanism. The special attention mechanism includes a fixed special attention weight. The second parameter (e.g., the sanitization label) may be used to verify whether the model has accurately identified the sensitive data in the application event.

Figure 4:
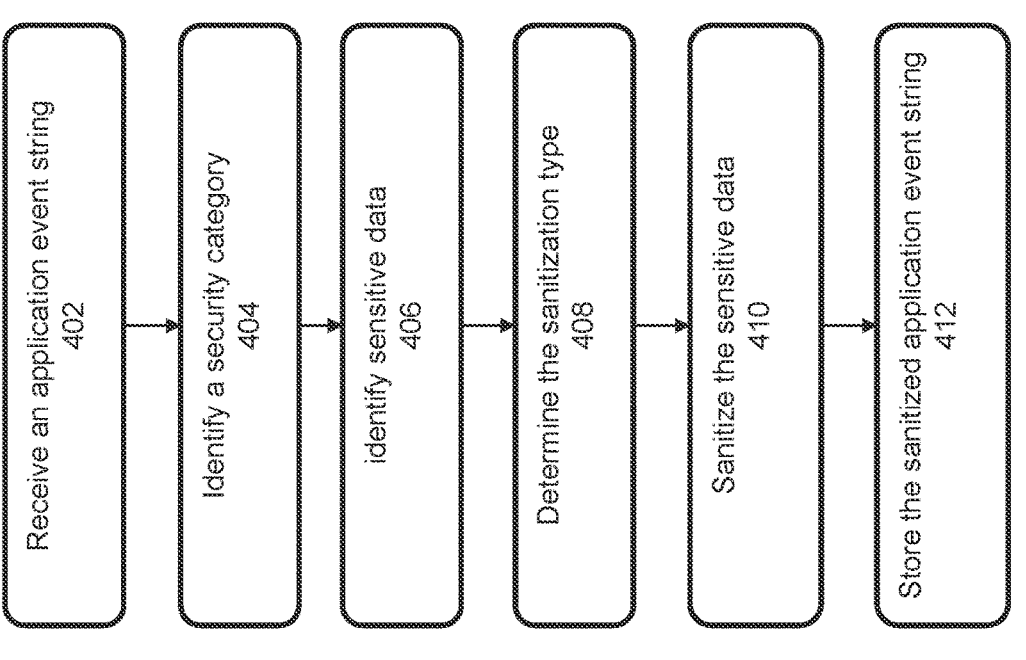
FIG. 4 is a flowchart illustrating a process for detecting and sanitizing sensitive data using a fully trained model, according to some embodiments.

FIG. 4 is a flowchart illustrating a process for detecting and sanitizing sensitive data using a fully trained model, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIGS. 1-2. However, method 400 is not limited to that example embodiment.

In 402, sanitizer 114 receives an application event string. The application event string may be generated based on an application event. The application event may be a user interaction with application 112. The interaction may be the user logging in, requesting a new password, transmitting a form, etc. The application event string may include a form ID or an API name and sensitive data.

In 404, a model (e.g., model 204-1-204-n or model 204-x) in the sanitizer identifies a security category associated with the application event string. The security category may be included in the application event string. Alternatively, the model may identify the security category by matching a substring in the application event string with a keyword.

In 406, the model identifies sensitive data included in the application event string to be sanitized. The model may be fully trained to detect and sanitize sensitive data from the application event string. The model is configured to implement a deep neural network, including a special attention mechanism. The special attention mechanism includes a fixed special attention weight.

In 408, the model determines the sanitization type. The model may determine the sanitization type based on the security category. The sanitization type may include redaction, pruning, or encryption. The security category may indicate a level of sensitivity of the sensitive data the application event string.

In 410, the model sanitizes the sensitive data in the application event string based on the sanitization type. The model may be configured to identify the position of the sensitive data in the application event string.

In 412, logger 116 transmits the sanitized application event string to a remote data storage (e.g., third-party data server 145 or data server 140) for storage.

Figure 5:
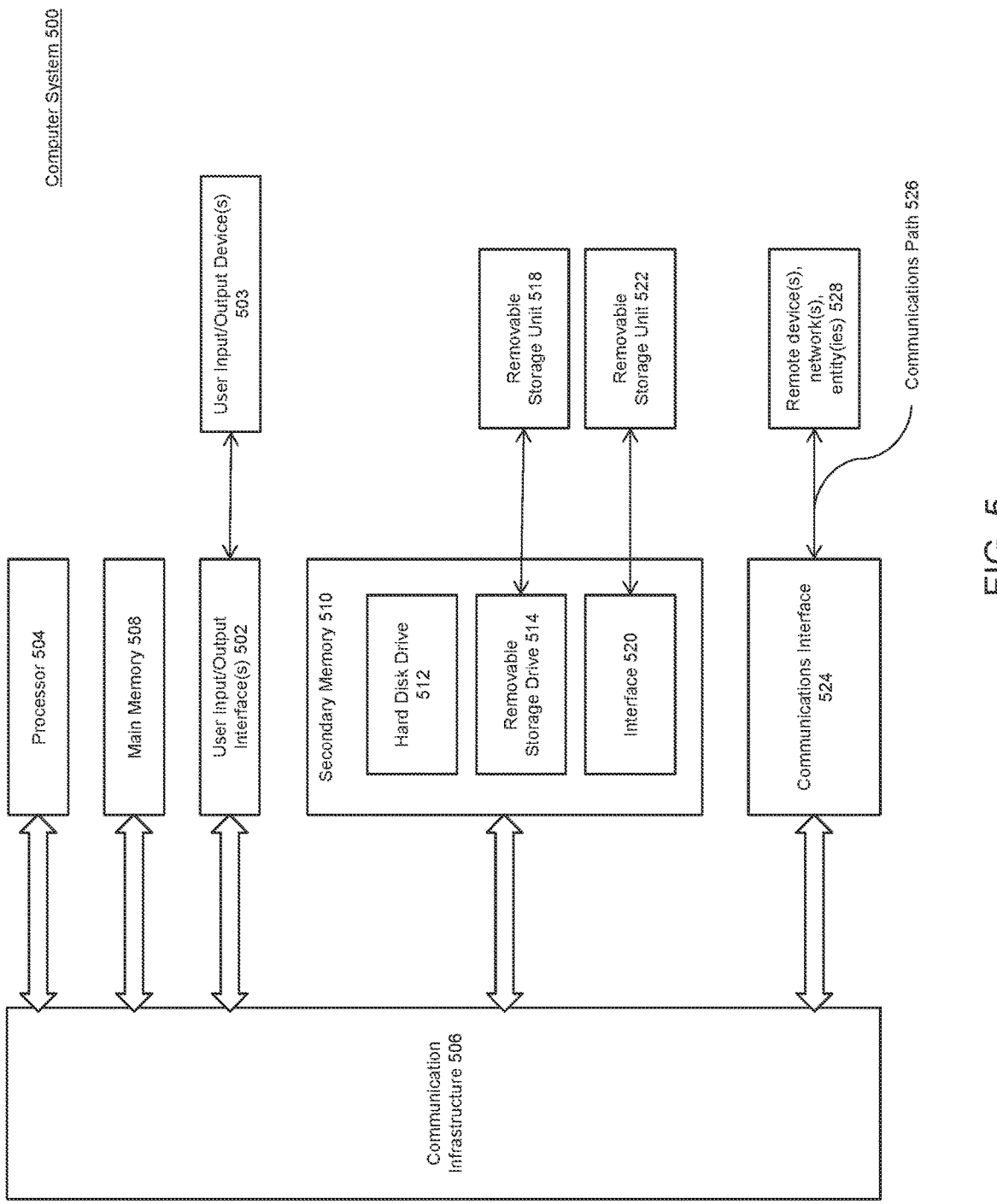
FIG. 5 depicts an example computer system useful for implementing various embodiments.

Various embodiments can be implemented, for example, using one or more computer systems, such as computer system 500 shown in FIG. 5. Computer system 500 can be used, for example, to implement methods 300 of FIG. 3 and method 400 of FIG. 4. Furthermore, computer system 500 can be at least part of client 110, third-party data server 145, and data server 140, as shown in FIG. 1. For example, computer system 500 route communication to various applications. Computer system 500 can be any computer capable of performing the functions described herein.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A method for sanitizing sensitive data, the method comprising:

retrieving, by a processor, training data comprising a plurality of tuples, wherein the each of the plurality of tuples comprises a first parameter and a second parameter, and wherein the first parameter comprises a string associated with an application event and the second parameter comprises a sanitization label;

for each tuple of the plurality of tuples:

matching, by the processor, a substring in the first parameter of the respective tuple to at least one keyword of a plurality of keywords;

identifying, by the processor, a security category corresponding to the at least one keyword; and expanding, by the processor, the first parameter of the respective tuple to comprise a respective string associated with the application event and the security category;

training, by the processor, a model to detect sensitive data from the application event using the plurality of tuples, including an expanded first parameter for each tuple of the plurality of tuples, wherein the model is configured to implement a deep neural network including a special attention mechanism; and sanitizing, by the processor, the sensitive data using the trained model, wherein the sanitizing comprises:

identifying, by the processor, using the trained model, the sensitive data in the application event and a sensitivity level of the sensitive data;

in response to the sensitivity level indicating low sensitivity for at least a subset of the sensitive data, identifying, by the processor, using the trained model, an encryption technique based on the amount of data in the subset of the sensitive data and a minimum required level of security; and encrypting, by the processor, the subset of the sensitive data using the encryption technique.

2. The method of claim 1, wherein the special attention mechanism comprises a fixed special attention weight.

3. The method of claim 1, further comprising: repeating the security category an m number of times in the expanded first parameter for the respective tuple.

4. The method of claim 1, further comprising:

receiving, by the processor, an application event string;

identifying, by the processor, using the trained model, a security category associated with the application event string;

identifying, by the processor, using the trained model, sensitive data included in the application event string to be sanitized;

determining, by the processor, using the trained model, a sanitization type;

sanitizing, by the processor, using the model, the sensitive data in the application event string, based on the sanitization type; and storing, by the processor, a sanitized application event string in a data storage device.

5. The method of claim 4, wherein the sanitization type comprises redaction, pruning, or encrypting data.

6. The method of claim 4, wherein determining the sanitization type is based on a level of sensitivity of the sensitive data.

7. The method of claim 1, wherein the first parameter of each tuple of the plurality of tuples is a domain-specific signal.

8. A system for sanitizing sensitive data, the system comprising:

a processor coupled to a memory, wherein the processor is configured to:

retrieve training data comprising a plurality of tuples, wherein the each of the plurality of tuples comprises a first parameter and a second parameter, and wherein the first parameter comprises a string associated with an application event and the second parameter comprises a sanitization label;

for each tuple of the plurality of tuples:

match a substring in the first parameter of the respective tuple to at least one keyword of a plurality of keywords;

identify a security category corresponding to the at least one keyword; and expand the first parameter of the respective tuple to comprise a respective string associated with the application event and the security category;

train a model to detect the sensitive data from the application event using the plurality of tuples, including an expanded first parameter for each tuple of the plurality of tuples, wherein the model is configured to implement a deep neural network including a special attention mechanism; and sanitize the sensitive data using the trained model by:

identifying the sensitive data in the application event and a sensitivity level of the sensitive data;

in response to the sensitivity level indicating low sensitivity for at least a subset of the sensitive data, identifying an encryption technique based on the amount of data in the subset of the sensitive data and a minimum required level of security; and encrypting the subset of the sensitive data using the encryption technique.

9. The system of claim 8, wherein the special attention mechanism comprises a fixed special attention weight.

10. The system of claim 8, wherein the processor is further configured to repeat security the category an m number of times in the expanded first parameter for the respective tuple.

11. The system of claim 8, wherein the processor is further configured to:

receive an application event string;

identify, using the trained model, a security category associated with the application event string;

identify, using the trained model, sensitive data included in the application event string to be sanitized;

determine, using the trained model, a sanitization type;

sanitize, using the trained model, the sensitive data in the application event string, based on the sanitization type; and store a sanitized application event string in a data storage device.

12. The system of claim 11, wherein the sanitization type comprises redaction, pruning, or encrypting data.

13. The system of claim 11, wherein determining the sanitization type is based on a level of sensitivity of the sensitive data.

14. The system of claim 8, wherein the first parameter of each tuple of the plurality of tuples is a domain-specific signal.

15. A non-transitory computer-readable medium having instructions stored thereon that, when executed by at least one computing device, cause the at least one computing device to perform operations comprising:

retrieving training data comprising a plurality of tuples, wherein each of the plurality of tuples comprises a first parameter and a second parameter, and wherein the first parameter comprises a string associated with an application event and the second parameter comprises a sanitization label;

for each tuple of the plurality of tuples:

matching a substring in the first parameter of the respective tuple to at least one keyword of a plurality of keywords;

identifying a security category corresponding to the at least one keyword; and expanding the first parameter of the respective tuple to comprise a respective string associated with the application event and the security category;

training a model to detect sensitive data from the application event using the plurality of tuples, including an expanded first parameter for each tuple of the plurality of tuples, wherein the model is configured to implement a deep neural network including a special attention mechanism; and sanitizing the sensitive data using the trained model, wherein the sanitizing comprises:

identifying the sensitive data in the application event and a sensitivity level for the sensitive data;

in response to the sensitivity level indicating low sensitivity for at least a subset of the sensitive data, identifying an encryption technique based on the amount of data in the subset of the sensitive data and a minimum required level of security; and encrypting the subset of the sensitive data using the encryption technique.

16. The non-transitory computer-readable medium of claim 15, wherein the special attention mechanism comprises a fixed special attention weight.

17. The non-transitory computer-readable medium of claim 15, wherein the operations further comprise repeating the security category an m number of times in the expanded first parameter for the respective tuple.

18. The non-transitory computer-readable medium of claim 15, wherein the operations further comprise:

receiving an application event string;

identifying, using the trained model, a security category associated with the application event string;

identifying, using the trained model, sensitive data included in the application event string to be sanitized;

determining, using the trained model, a sanitization type;

sanitizing, using the trained model, the sensitive data in the application event string, based on the sanitization type; and storing the event string including the sanitization label in a data storage device.

19. The non-transitory computer-readable medium of claim 18, wherein the sanitization type comprises redaction, pruning, or encrypting data.

20. The non-transitory computer-readable medium of claim 18, wherein determining the sanitization type is based on a level of sensitivity of the sensitive data.

\* \* \* \* \*